No. 792,750. PATENTED JUNE 20, 1905.
E. BARTON.
LAWN TRIMMER.
APPLICATION FILED OCT. 18, 1904.
2 SHEETS—SHEET 2.
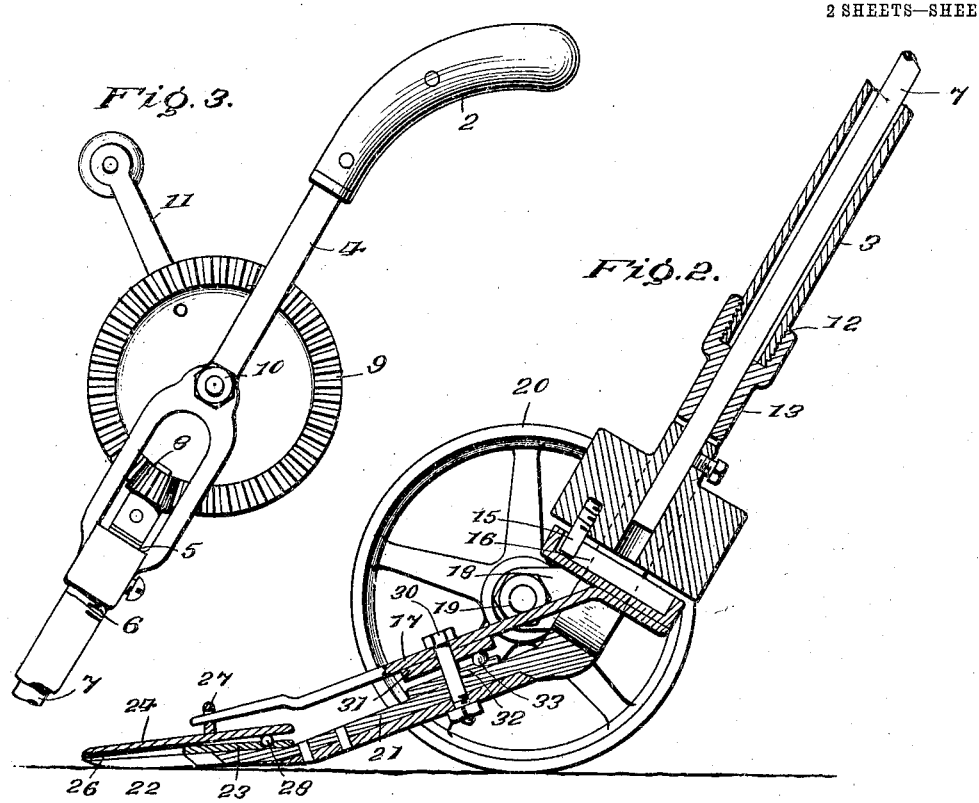
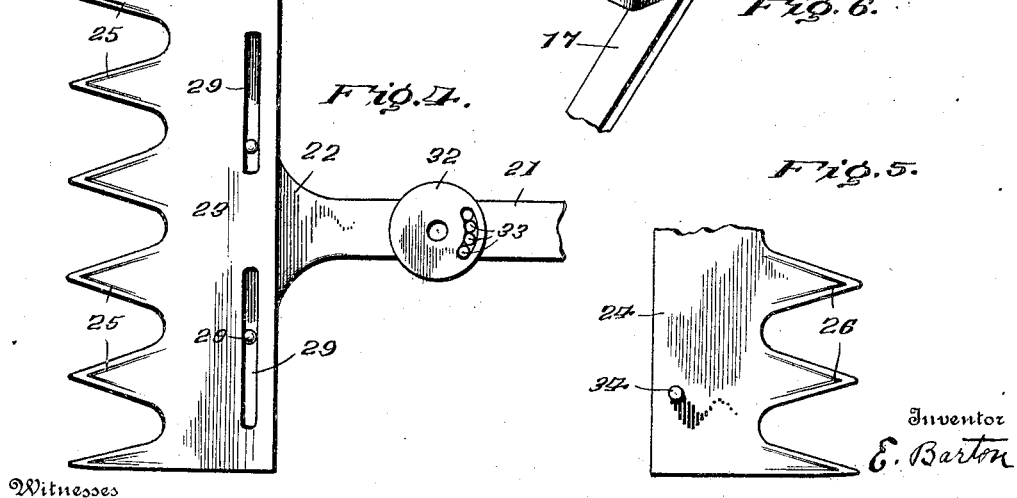
Witnesses
Louis H. Schmidt.
M Baker.
Inventor
E. Barton
By Swift & Co.
Attorneys No. 792,750. Patented June 20, 1905.

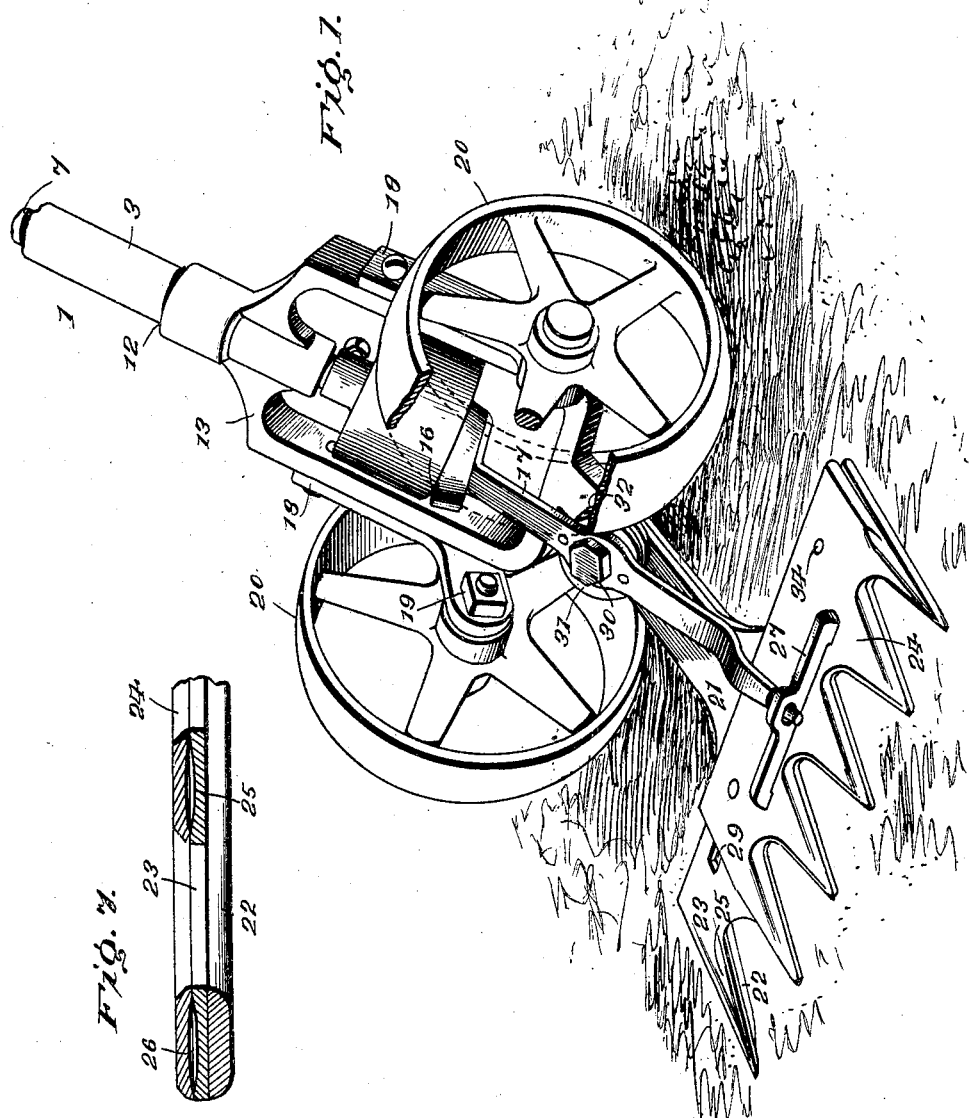

UNITED STATES PATENT OFFICE.

EDMUND BARTON, OF IVYLAND, PENNSYLVANIA.

LAWN-TRIMMER.

SPECIFICATION forming part of Letters Patent No. 792,750, dated June 20, 1905.

Application filed October 18, 1904. Serial No. 228,994.

*To all whom it may concern:*

Be it known that I, EDMUND BARTON, a citizen of the United States, residing at Ivyland, in the county of Bucks and State of Pennsylvania, have invented a new and useful Lawn-Trimmer; and I do hereby declare the following to be a full, clear, and exact description of the invention, such as will enable others skilled in the art to which it appertains to make and use the same.

The invention relates to a lawn-trimmer; and it has for its object to provide a simple, inexpensive, and efficient device which will be light, strong, and durable and which will be adapted to be conveniently operated by hand.

A further object of the invention is to provide a device of this character which will be especially adapted for trimming lawns at points inaccessible to an ordinary lawn-cutter.

Another object of the invention is to improve the construction of the cutting mechanism and to provide a cutting apparatus which will be practically self-sharpening and which will remain in effective condition until the blades have been practically worn out.

Also it is the object of the invention to enable the lawn-trimmer to operate practically without friction, so that there will be little or no wear of the parts.

With these and other objects in view the invention consists in the construction and novel arrangement of parts hereinafter described and shown, and particularly pointed out in the claims hereto appended.

In the drawings forming part of this specification, and in which like numerals of reference designate corresponding parts, Figure 1 is a perspective view of a lawn-trimmer constructed in accordance with this invention. Fig. 2 is a longitudinal sectional view. Fig. 3 is a side elevation of the top of the lawn-trimmer, showing the handle and the gearing for operating the longitudinal shaft. Fig. 4 is a plan view of the front portion of the lawn-trimmer, the movable cutter-bar and the oscillatory lever being removed. Fig. 5 is a reverse plan view of a portion of the movable cutter-bar. Fig. 6 is a detail view of the upper end of the lever. Fig. 7 is a detail sectional view of the cutting mechanism.

Referring to the drawings, 1 designates a handle-bar provided at its upper end with a curved handle or grip 2, adapted to be grasped by the operator. The handle-bar is composed of a lower tubular portion 3 and an upper solid portion or bar 4, to which the handle or grip 2 is fastened and which is provided at its lower portion with an opening 5. The lower end of the upper portion of the handle-bar is provided with an interiorly-threaded socket 6 for the reception of the upper end of the tubular portion 3, which is threaded for engaging the said socket. The tubular portion forms a casing or housing for a longitudinal shaft 7, to the upper end of which is secured a pinion 8, which meshes with a gear-wheel 9. The gear-wheel 9, which is mounted on a bolt 10 and which is reversible to change it from one side to the other of the handle-bar, is provided with a crank-handle 11. The crank-handle is arranged in convenient position to be grasped by one hand while holding the grip or handle with the other hand.

The lower end of the handle-bar is threaded and is secured in a socket 12 of a frame 13, which is provided with an opening for the reception of a crank-wheel secured by a set-screw or other suitable means to the lower end of the shaft 7. The crank-wheel, which is of sufficient size and weight to operate as a balance-wheel, is provided with a wrist or crank pin 15, which operates in a vertical way 16 of a vibratory or oscillatory lever 17. The vertical way consists of a groove formed in a block or piece which is secured to the inner or upper end of the lever 17. The frame, which is substantially rectangular at the said opening, is provided with an approximately T-shaped front portion and has secured to it at opposite sides of the opening bearing-plates 18, extending upward and outward from the sides of the frame and provided with perforations or openings to receive bolts 19, on which are mounted ground-wheels 20. The ground-wheels support the lawn-trimmer and enable the same to be readily moved over the surface to be trimmed.

The T-shaped front portion of the frame consists of a central shank 21 and a head or shoe 22, to which is secured a lower fixed cutter-bar 23, which coöperates with an upper movable cutter-bar 24. These cutter-bars are provided with knives having concave faces 25 and 26, which as the blades or knives become worn are adapted to maintain them in a sharp effective condition. In other words, any wear on the blades incident to the reciprocation of the upper cutter-bar will operate to keep the blades sharp.

The effectiveness of the cutting apparatus is increased by arranging the blades of the upper cutter-bar at a slight angle to the blades of the lower cutter-bar and providing yieldable means for engaging the upper cutter-bar to permit the blades to readily pass each other. The upper cutter-bar is provided with a flange 27, having an opening for the reception of the front or outer end of the lever 17, which reciprocates the upper cutter-bar. The upper cutter-bar is supported at an angle by antifriction-balls 28, arranged in grooves 29 of the lower cutter-bar. The lever 17 is fulcrumed on a bolt 30, which pierces the shank of the frame, and it also passes through a pair of bearing-plates 31 and 32, secured, respectively, to the lever and to the frame. These bearing-plates are in the form of disks, and the lower one is provided in the rear of the pivot-bolt 30 with a transverse groove in which is arranged a series of antifriction-balls 33. These balls are interposed between the bearing-plates 31 and 32 and serve as a fulcrum, the pivot-bolt being adapted to exert a clamping action on the front portion of the lever, which is resilient and which yieldably engages the upper cutter-bar.

The upper cutter-bar is provided with a pair of depending lugs 34, which operate in the grooves of the lower cutter-bar and guide the said upper cutter-bar in its reciprocation.

The peripheries or rims of the wheels 20 are tapered toward their outer edges to present inclined exterior faces for preventing the lawn-trimmer from slipping when trimming hillsides or rough surfaces, the inner edges being adapted to cut slightly into the ground.

What I claim is—

1. In a device of the class described, the combination of upper and lower cutter-bars provided with blades set at an angle to each other and provided with longitudinal concave faces, and means for reciprocating one of the cutter-bars, substantially as described.

2. In a device of the class described, the combination of a lower cutter-bar provided with grooves, an upper cutter-bar having lugs fitting in the grooves, antifriction-balls interposed between the cutter-bars and operating in the grooves and means for reciprocating the upper cutter-bar, substantially as described.

3. In a device of the class described, the combination of upper and lower cutter-bars, a lever having a resilient portion connected with the upper cutter-bar, said lever being pivoted between its ends, antifriction devices located in rear of the pivot and means for operating the lever, substantially as described.

4. In a device of the class described, the combination of a frame, a lower cutter-bar mounted on the frame, an upper cutter-bar, a lever connected with the upper cutter-bar, circular bearing-plates interposed between the lever and the frame, an adjustable pivot piercing the lever, the bearing-plates and the frame, antifriction devices interposed between the bearing-plates and located in rear only of the pivot, and means for operating the lever, substantially as described.

5. In a device of the class described, the combination of a frame, upper and lower cutter-bars, a lever connected with the upper cutter-bar and provided with a block inclined thereto and having a groove, a combined crank and balance-wheel, a removable pin connected with said balance-wheel and adapted to engage said groove, and means for operating said balance-wheel, substantially as described.

In testimony whereof I have hereto affixed my signature in the presence of two witnesses.

EDMUND BARTON.

Witnesses:
W. J. JACKSON,
G. M. SAYLOR.